(12) United States Patent
Kano

(10) Patent No.: US 9,549,541 B2
(45) Date of Patent: Jan. 24, 2017

(54) FISHING REEL HAVING A FISHING LINE GUIDE THAT GUIDES A FISHING LINE WOUND ON A SPOOL

(71) Applicant: Globeride, Inc., Tokyo (JP)

(72) Inventor: Shuta Kano, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 14/978,031

(22) Filed: Dec. 22, 2015

(65) Prior Publication Data

US 2016/0183508 A1  Jun. 30, 2016

(30) Foreign Application Priority Data

Dec. 25, 2014  (JP) .................................. 2014-262955

(51) Int. Cl.
*A01K 89/01* (2006.01)
(52) U.S. Cl.
CPC ... *A01K 89/01931* (2015.05); *A01K 89/01904* (2015.05); *A01K 89/01916* (2015.05)
(58) Field of Classification Search
CPC ....................... A01K 89/015; A01K 89/01912
See application file for complete search history.

(56) References Cited

U.S. PATENT DOCUMENTS

| 2,057,178 | A | * | 10/1936 | Balz | ................... A01K 89/0155 |
|   |   |   |   |   | 242/279 |
| 2,160,175 | A | * | 5/1939 | Shakespeare, Jr. | .. A01K 89/015 |
|   |   |   |   |   | 242/279 |
| 2,544,143 | A | * | 3/1951 | Dunn | ................... A01K 89/015 |
|   |   |   |   |   | 242/279 |
| 2,631,792 | A | * | 3/1953 | Morrison | ............. A01K 89/015 |
|   |   |   |   |   | 242/323 |
| 2,639,870 | A | * | 5/1953 | Graham | ........... A01K 89/01918 |
|   |   |   |   |   | 242/260 |
| 2,652,212 | A | * | 9/1953 | Holahan, Jr. | ........ A01K 89/015 |
|   |   |   |   |   | 140/3 R |
| 3,111,287 | A | * | 11/1963 | Baenziger | ........ A01K 89/01918 |
|   |   |   |   |   | 242/236 |
| 3,237,900 | A | * | 3/1966 | Odom | ................... A01K 89/015 |
|   |   |   |   |   | 242/157 R |
| 3,429,521 | A | * | 2/1969 | Jones | ................... A01K 89/015 |
|   |   |   |   |   | 192/41 R |
| 6,053,444 | A | * | 4/2000 | Yamaguchi | .......... A01K 89/015 |
|   |   |   |   |   | 242/275 |

(Continued)

FOREIGN PATENT DOCUMENTS

JP  2013-243997  12/2013

*Primary Examiner* — Emmanuel M Marcelo
(74) *Attorney, Agent, or Firm* — Pillsbury Winthrop Shaw Pittman, LLP

(57) ABSTRACT

A fishing reel according to an embodiment includes a spool rotatably supported between a left side plate and a right side plate of a reel body, and a fishing line guide having a first portion and a second portion. The first portion has a first through hole, the second portion has a second through hole, the first through hole guides a fishing line to be wound on the spool, and the second through hole has a width in a left-right direction larger than the first through hole and being continuous with the first through hole. A front surface of the first portion is angled to a rear side with respect to a perpendicular line extended from a center of a rotational axis of the spool to an extending direction of the fishing line.

6 Claims, 13 Drawing Sheets

(56) References Cited

U.S. PATENT DOCUMENTS

2009/0250541 A1\* 10/2009 Tsutsumi ............. A01K 89/015
 242/257
2012/0104135 A1\* 5/2012 Toma ................... A01K 89/015
 242/227
2014/0183292 A1 7/2014 Kaneko et al.

\* cited by examiner

FISHING REEL HAVING A FISHING LINE GUIDE THAT GUIDES A FISHING LINE WOUND ON A SPOOL

CROSS-REFERENCE TO RELATED APPLICATIONS

This application is based on and claims the benefit of priority from Japanese Patent Application Serial No. 2014-262955 (filed on Dec. 25, 2014), the contents of which are hereby incorporated by reference in their entirety.

TECHNICAL FIELD

The present disclosure relates to a fishing reel having a fishing line guide that guides a fishing line wound on a spool.

BACKGROUND

A known double-bearing fishing reel includes a spool rotatably supported between left and right side plates, and a level wind mechanism. The level wind mechanism includes a fishing line guide for uniformly winding a fishing line on the spool. The fishing line guide reciprocates in a left-right direction in accordance with winding operation of a handle. Therefore a fishing line threaded through the fishing line guide is uniformly wound on the spool by the winding operation of the handle.

Such a conventional fishing reel has a disadvantage that fishing tackles cannot be casted far away since a relatively large resistive force works on the fishing line when the line in released from the reel. In order to overcome this disadvantage, there is a conventional example in which a portion of an insertion hole formed in the fishing line guide is made wider than the other portion of the insertion hole (see, for example, Japanese Patent Application Publication 2013-243997). The fishing line guide is arranged on the reel body such that a fishing line passes through the wider portion of the insertion hole when the fishing line is released, whereas the fishing line passes through the narrow portion of the insertion hole to be guided to the spool when the fishing line is wound on the spool. Accordingly the resistive force acting on the fishing line from the fishing line guide can be decreased when the fishing line is released, and the line is orderly guided to the spool through the narrow portion of the hole when the line is wound.

The narrow portion of the insertion hole in the conventional fishing line guide is configured to have a slightly larger width than the diameter of a fishing line in order to prevent the line from moving roughly in the left-right direction when the line is retained in the narrow portion. In this way, the fishing line can be orderly wound on the spool. However, when the fishing line is knotted, the knot tends to get caught on the narrow portion of the hole.

SUMMARY

One object of the disclosure is to provide a fishing line guide in which a fishing line does not get caught thereon when the fishing line is wound on the spool. These and other objects will be apparent upon reading the entire following description.

A fishing reel according to an embodiment includes a spool rotatably supported between a left side plate and a right side plate of a reel body, and a fishing line guide having a first portion and a second portion. The first portion has a first through hole, the second portion has a second through hole, the first through hole guides a fishing line to be wound on the spool, and the second through hole has a width in a left-right direction larger than the first through hole and being continuous with the first through hole. A front surface of the first portion is angled to a rear side with respect to a perpendicular line extended from a center of a rotational axis of the spool to an extending direction of the fishing line.

According to the embodiment, the front surface of the first portion is angled to the rear side with respect to the perpendicular line extended from a center of a rotational axis of the spool to an extending direction of the fishing line. Therefore, even when a knot having a size with which the knot cannot pass through the narrow first through hole, the knot is guided along the front surface of the first portion to the wide second through hole formed in the second portion and can be then escaped toward the spool through the second through hole. In this way, it is possible to obtain the fishing line guide in which a fishing line is less likely to get caught thereon.

According to one embodiment of the invention, a rear surface of the first portion is angled to a front side with respect to the perpendicular line. According to this embodiment, it is possible to prevent the fishing line from getting caught on the fishing line guide when the fishing line is drawn out from the spool.

According to the above aspects of the disclosure, it is possible to provide a fishing line guide in which a fishing line does not get caught thereon when the fishing line is wound on the spool.

BRIEF DESCRIPTION OF THE DRAWINGS

In FIG. 1, a portion of the fishing reel is illustrated sectionally to expose a fishing line guide.

FIG. 4 illustrates a knot of the fishing line situated at a front side of the fishing line guide.

FIG. 5 illustrates a knot of the fishing line situated at a rear side of the fishing line guide.

In FIG. 6, a portion of the fishing reel is illustrated sectionally to expose a fishing line guide.

FIG. 7 illustrates a clutch mechanism in ON state.

FIG. 8 illustrates the clutch mechanism in OFF state.

FIG. 10 illustrates the clutch mechanism in ON state.

FIG. 11 illustrates the clutch mechanism in OFF state.

FIG. 12 illustrates a position of a fishing line S (a knot T) when the fishing line S moves the lowest track during winding of the line S.

DESCRIPTION OF THE PREFERRED EMBODIMENTS

Figure 1:
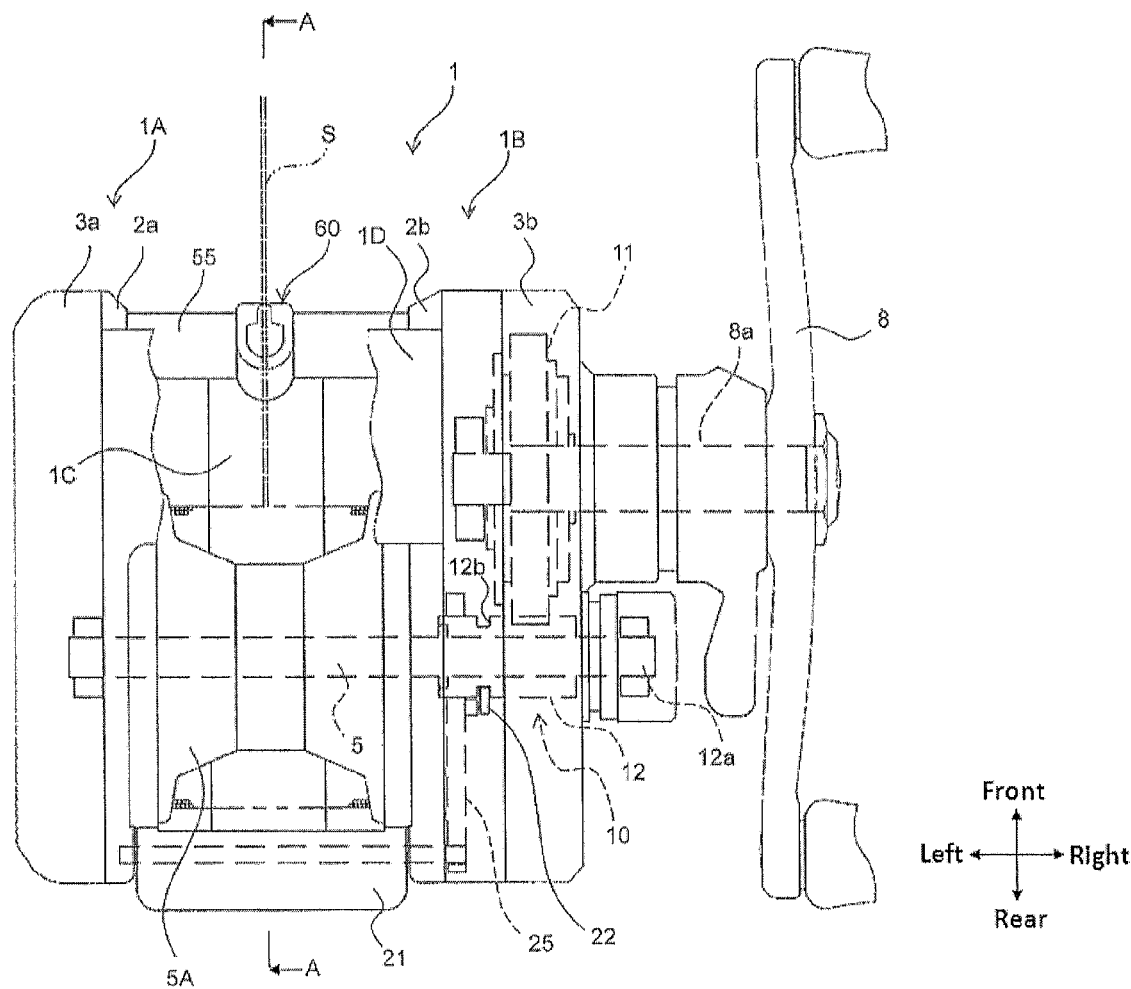
FIG. 1 is a schematic plan view of a fishing reel according to one embodiment of the invention.

Various embodiments of the present invention will be hereunder described with reference to the accompanying drawings. In the drawings, like elements may be labeled similarly.

Figure 2:
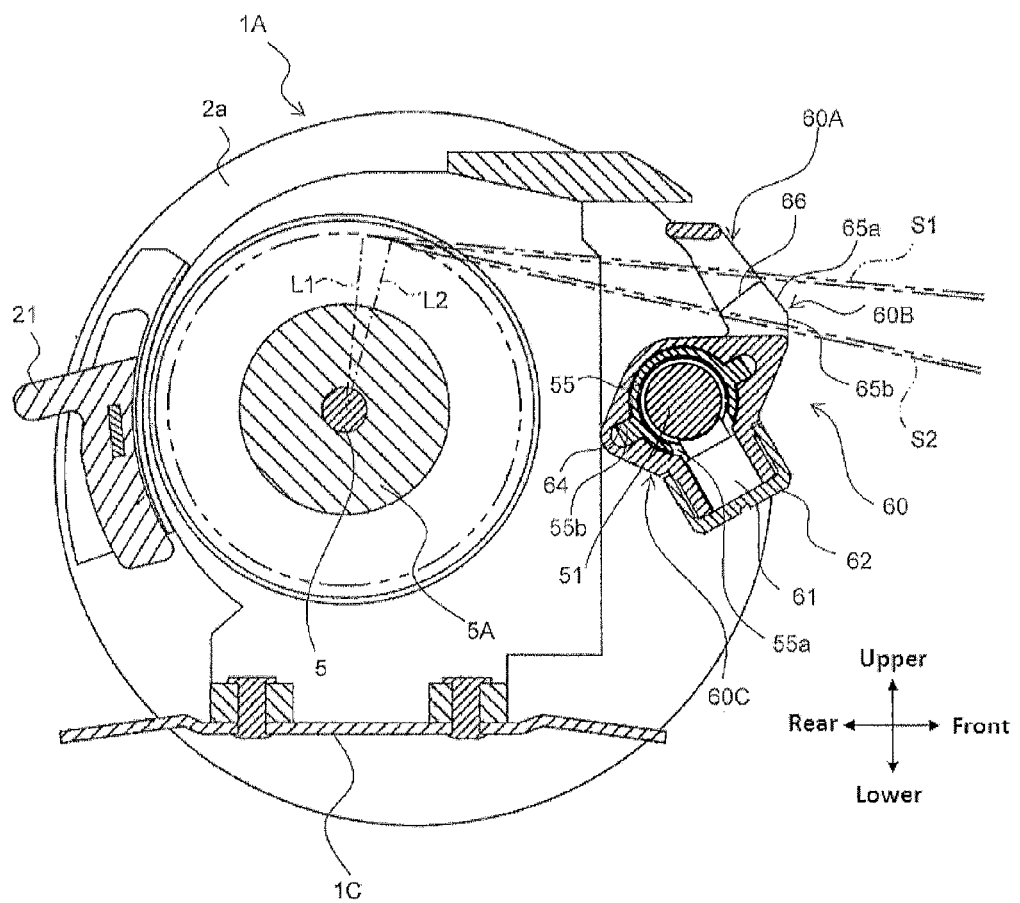
FIG. 2 is a sectional view of the fishing reel of FIG. 1 along the line A-A.

Referring to FIGS. 1 to 5, a fishing reel according to one embodiment of the invention will be described. Firstly, general description of the fishing reel according to one embodiment of the invention will be given with reference to FIGS. 1 and 2. FIG. 1 is a plane view of the fishing reel according to the embodiment and FIG. 2 is a sectional view of the fishing reel of FIG. 1 along the line A-A.

As illustrated in FIGS. 1 and 2, the fishing reel according to the embodiment may include a reel body 1, a spool 5A, a handle 8, a drive force transmission mechanism 10, a clutch mechanism 20, and a level wind mechanism 50.

The reel body 1 may include a left side plate 1A and a right side plate 1B. The left side plate 1A may include a left frame 2a and a left cover 3a that covers the left frame 2a. The right side plate 1B may include a right frame 2b and a right cover 3b that covers the right frame 2b. The reel body 1 may be attached to a fishing rod (not shown) through a reel leg 1C provided between the left side plate 1A and the right side plate 1B.

A spool 5A on which a fishing line S is wound is disposed between the left and right side plates 1A, 1B. A spool shaft 5 of the spool 5A is rotatably supported through a bearing between the left frame 2a and the right frame 2b. Such a fishing reel in which the spool shaft is axially supported between the left and right side plates 1A, 1B is generally referred to as a double-bearing reel or a bait casting reel. A thumb rest 1D may be provided on the front side of the spool 5 between the left and right side plates 1A, 1B.

A handle 8 is provided on the right side plate 1B to drive the spool 5A. A handle shaft 8a extending in the left-right direction is fixed onto the handle 8 and rotation of the handle 8 is transmitted to the spool shaft 5A and the level wind mechanism 50 through the handle shaft 8A and other drive force transmission components.

The drive force transmission mechanism 10 according to the embodiment may be disposed within an interior space of the right side plate 1B defined by the right frame 2b and the right cover 3b. The drive force transmission mechanism 10 is configured to transmit the rotation of the handle 8 to the spool shaft 5. More specifically, the drive force transmission mechanism 10 according to the embodiment may include a drive gear 11 that rotates in accordance with the rotation of the handle shaft 8a, and a pinion 12 engaged with the drive gear 11. In one embodiment, the pinion 12 may be movable along the axial direction of a pinion shaft 12a that is disposed coaxially with the spool shaft 5. Moreover a left end of the pinion 12 is configured to engage with a right end of the spool shaft 5 when the clutch mechanism 20 is in ON state, as described in further detail below. Further, a groove 12b is formed on an outer periphery of the pinion 12 to extend in the circumferential direction. The groove 12b is engaged with a yoke 22 of the clutch mechanism 20 as described in further detail below. It may be appreciated that the drive force transmission mechanism 10 of the illustrated embodiment is merely exemplary which can be applied to the fishing reel according to the embodiment, and any drive force transmission mechanism known to those skilled in the art may be used for the fishing reel of the invention.

The clutch mechanism 20 according to the embodiment is also disposed in the interior space of the right side plate 1B. The clutch mechanism 20 is configured to switch ON/OFF the transmission of the drive force between the handle shaft 8a and the spool shaft 5 in accordance with operation of a clutch lever 21. In one embodiment, the clutch mechanism 20 may include a clutch plate 25 rotatably supported by the right frame 2b, and the yoke 22 continuously biased toward the clutch plate 25 by a spring member (not illustrated). The yoke 22 is engaged with the groove 12b of the pinion 12 when the clutch mechanism 20 is in the ON state, and the left end of the pinion 12 is engaged with the right end of the spool shaft 5. In this way, the rotation of the handle 8A is transmitted to the spool shaft 5 through the drive force transmission mechanism 10 when the clutch mechanism 20 is in the ON state.

The clutch mechanism 20 is switched to the OFF state from the ON state when the clutch lever 21 is operated to be pushed down. More specifically, the clutch plate 25 is rotated in a counter-clockwise direction when the clutch lever 21 is pushed down. When the clutch plate 25 is rotated, cam surfaces formed on the surface of the clutch plate 25 push the yoke 22 to the right side direction and eventually the pinion 12 is released from the spool shaft 5. When the clutch mechanism 20 is switched to the OFF state by the pushing down operation of the clutch lever 21 as described above, the pinion 12 is released from the spool shaft 5, and the transmission of the drive force between the handle shaft 8a and the spool shaft 5 is stopped.

When the clutch mechanism 20 is in the OFF state, the spool 5A rotates freely since the drive force transmission between the spool 5A and the handle 8 is inhibited. Therefore, casting is performed when the clutch mechanism 20 in in the OFF state. Whereas winding of the fishing line is performed when the clutch mechanism 20 is in the ON state.

The fishing reel according to one embodiment of the invention may include an automatic return mechanism that returns the clutch mechanism 20 from the OFF state to the ON state when the handle 8 is rotated. It may be appreciated that the clutch mechanism 20 of the illustrated embodiment is merely exemplary which can be applied to the fishing reel according to the embodiment, and any clutch mechanisms known to those skilled in the art may be used for the fishing reel of the invention.

The level wind mechanism 50 according to the embodiment is disposed between the left and right side plates 1A and 1B on the front side of the spool 5A. In one embodiment, the level wind device 50 may include the fishing line guide 60 through which the fishing line S is inserted. The fishing line guide 60 is configured to reciprocate in the left-right direction in accordance with the rotational operation of the handle 8 so that the fishing line S can be uniformly wound on the spool 5A through the fishing line guide 60.

The level wind mechanism 50 according to an embodiment of the invention may include a worm shaft 51 that is rotatably supported between the left side plate 1A and the right side plate 1B through a bearing, and a tubular body 55 rotatably disposed between the left side plate 1A and the right side plate 1B and through which the worm shaft 51 is inserted. In one embodiment, a spiral groove is formed on the surface of the worm shaft 51, and an elongated opening 55a extending in the axial direction is formed on the tubular body 55. The worm shaft 51 may be housed in the tubular body 55 such that the spiral groove is partially exposed from the elongated opening 55a of the tubular body 55. An input gear (not shown) to which the rotation of the handle shaft 8*a* is input is provided at the right end of the worm shaft 51. The rotation of the handle 8 is transmitted to the worm shaft 51 through the input gear.

The fishing line guide 60 may include a tip portion 60A in which a wide through hole 67*a* is formed, a guide portion 60B in which a narrow through hole 67*b* is formed, and an attachment portion 60C for attaching the fishing line guide 60 to the tubular body 55. The through hole 67*a* is formed continuously from the through hole 67*b*. The tip portion 60A and the guide portion 60B may be formed of a material having a small friction resistance with a fishing line, such as SUS, titanium and the like.

Figure 3:
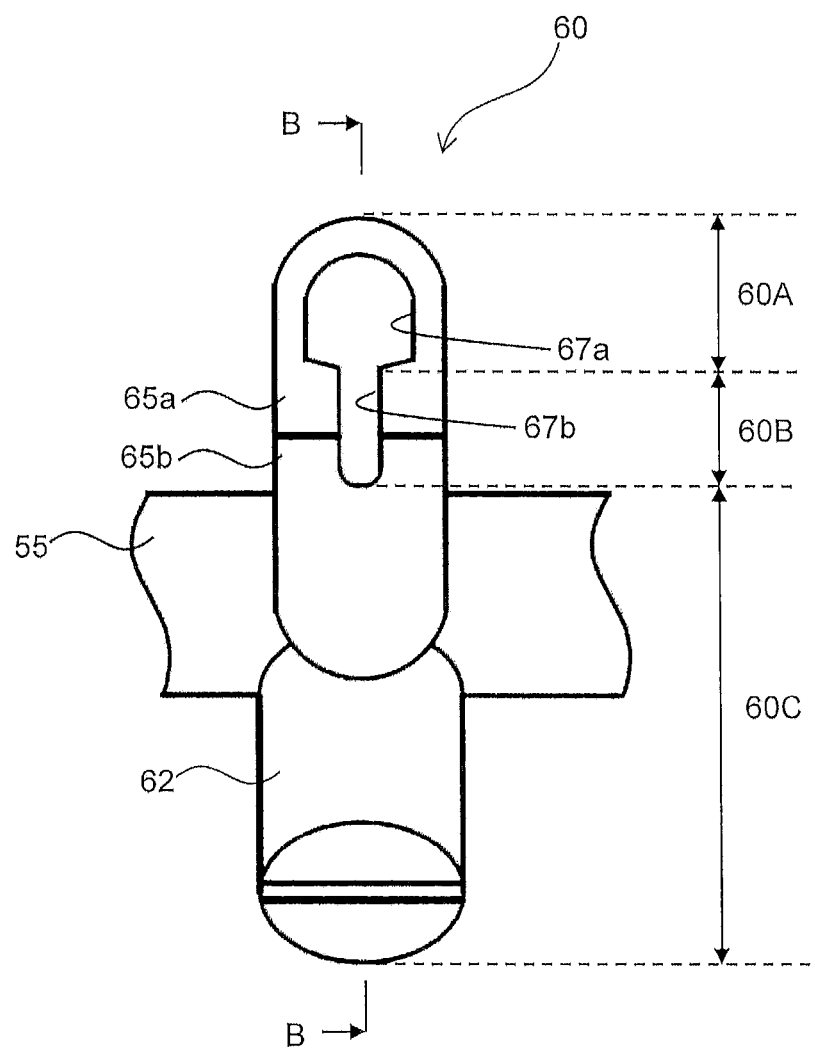
FIG. 3 is an elevation view of the fishing line guide provided in the fishing reel of FIG. 1.

As clearly illustrated in FIG. 3, the through hole 67*a* in the tip portion 60A is formed to have a width in the left-right direction larger than that of the through hole 67*b* in the guide portion 60B. The bottom portion of the through hole 67*a* is narrowed so as to be continuous with the through hole 67*b*. In other words, the width of the through hole 67*a* is decreased at the bottom so as to be smoothly connected with the through hole 67*b*. The through hole 67*a* is formed at a position where the fishing line S passes when the fishing line S is released. Usually the fishing line S has been wound many times on the spool 5A at the time of releasing of the fishing line S by casting or the like, so that the fishing line S tends to pass the upper track due to a large thickness of the fishing line S wound on the spool 5A. Since the fishing line S passes through the through hole 67*a*, it is possible to reduce the chances for the fishing line S to contact with the fishing line guide 60 and thereby it is possible to prevent reduction in a flying distance of a tackle. A typical track of the fishing line at the time of releasing of the fishing line is denoted by "S1" in FIG. 2. A perpendicular line to the track 51 from the center of the spool shaft 5 (the rotational axis of the spool 5A) is denoted by "L1" in FIG. 2.

The through hole 67*b* may have a width in the left-right direction slightly larger than the diameter of the fishing line S and may be situated at a position where the fishing line S passes when the fishing line S is wound on the spool 5A. When the fishing line S is wound on the spool 5A, the amount of the line wound on the spool 5A tends to be small and the fishing line S is tensioned downwardly in order to pull the tackle attached to the fishing line S out from the water. As a result, the fishing line S likely passes through the through hole 67*b*. By guiding the fishing line S through the through hole 67*b* to the spool 5A, it is possible to restrict the movement of the fishing line S in the left-right direction and therefore the line S is orderly wound on the spool 5A. The lowest track among tracks which the fishing line S can take at the time of winding of the fishing line S is denoted by "S2" in FIG. 2. A perpendicular line to the track S2 from the center of the spool shaft 5 (the rotational axis of the spool 5A) is denoted by "L2" in FIG. 2.

The guide portion 60B is herein defined as the portion between a virtual plane that contains the track S2 and is parallel to the spool shaft, and a virtual plane that is parallel to the spool shaft and contains a track (not shown) where the fishing line S passes the upper end of the through hole 67*b*. The tip portion 60A is herein defined as the portion of the fishing line guide 60 situated upper (tip side) than the guide portion 60B. The attachment portion 60C is herein defined as the portion of the fishing line guide 60 situated lower (base side) than the guide portion 60B.

The attachment portion 60C retains a slidable member 61 that engages with the spiral groove formed on the worm shaft 51 through the elongated opening 55*a*. The slidable member 61 is fixed to the attachment portion 60C with a cap nut 62. Rotation stoppers 55*b* extending along the axial direction are formed on an outer periphery of the tubular body 55. The fishing line guide 60 is attached to the tubular body 55 such that engagement portions (concave portions) 64 formed in the attachment portion 60C are engaged with the rotation stoppers 55*b*. Because the rotation stoppers 55*b* are engaged with the engagement portions 64, the fishing line guide 60 is not rotated on the tubular body 55 by the rotation of the worm shaft 51 but reciprocates in the left-right direction.

In the above-described level wind device 50, when the handle 8 is operated for winding, the worm shaft 51 is rotationally driven via a connection gear provided on the handle shaft 8*a* and the input gear engaged with the connection gear. When the worm shaft 51 is rotated, the slidable member 61 reciprocates in the left-right direction as the slidable member 61 is engaged with the spiral groove formed on the outer peripheral surface of the worm shaft 51. In this manner, the fishing line guide 60 reciprocates in the left-right direction along the worm shaft 51 between the left side plate 1A and the right side plate 1B in accordance with the rotation of the handle 8.

Figure 4:
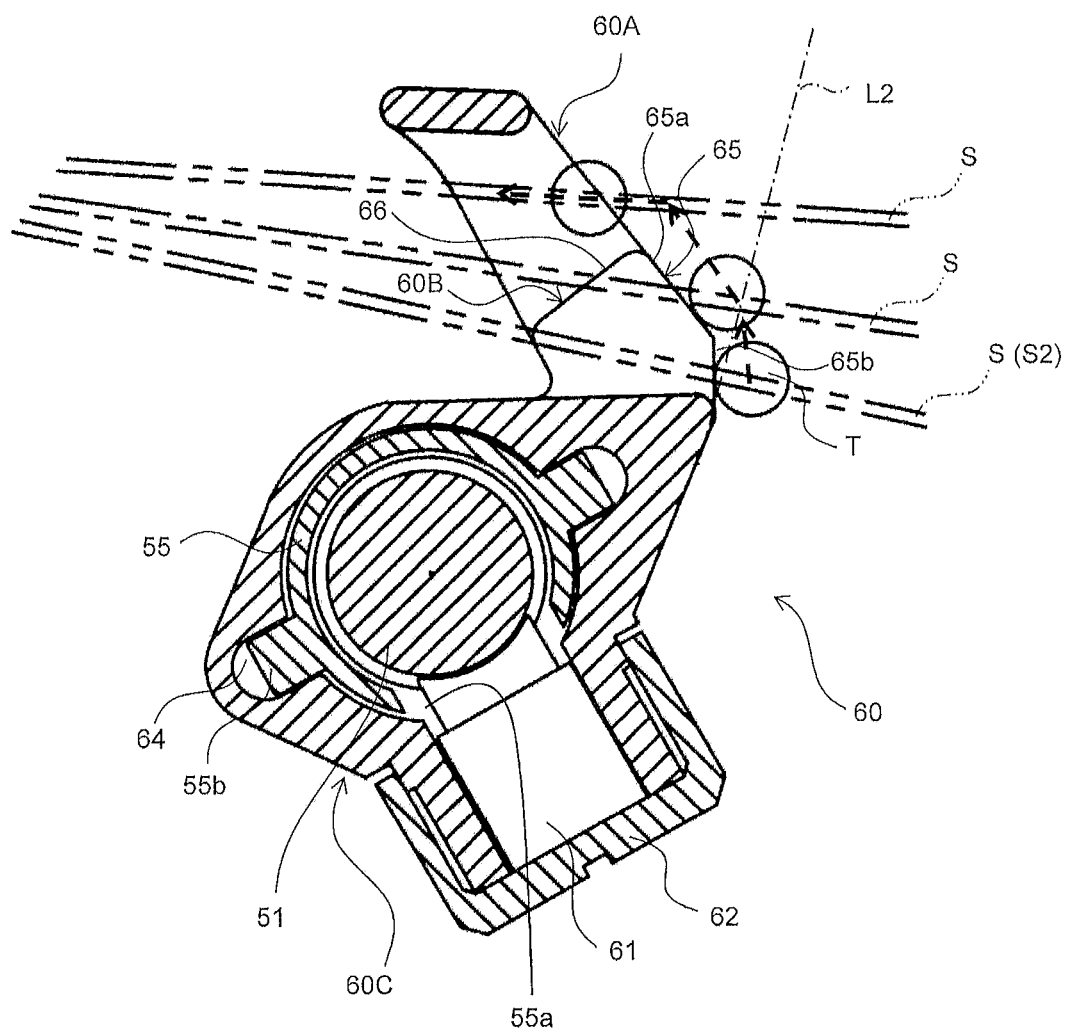
FIG. 4 is a sectional view of the fishing line guide of FIG. 3 along the line B-B.
Figure 5:
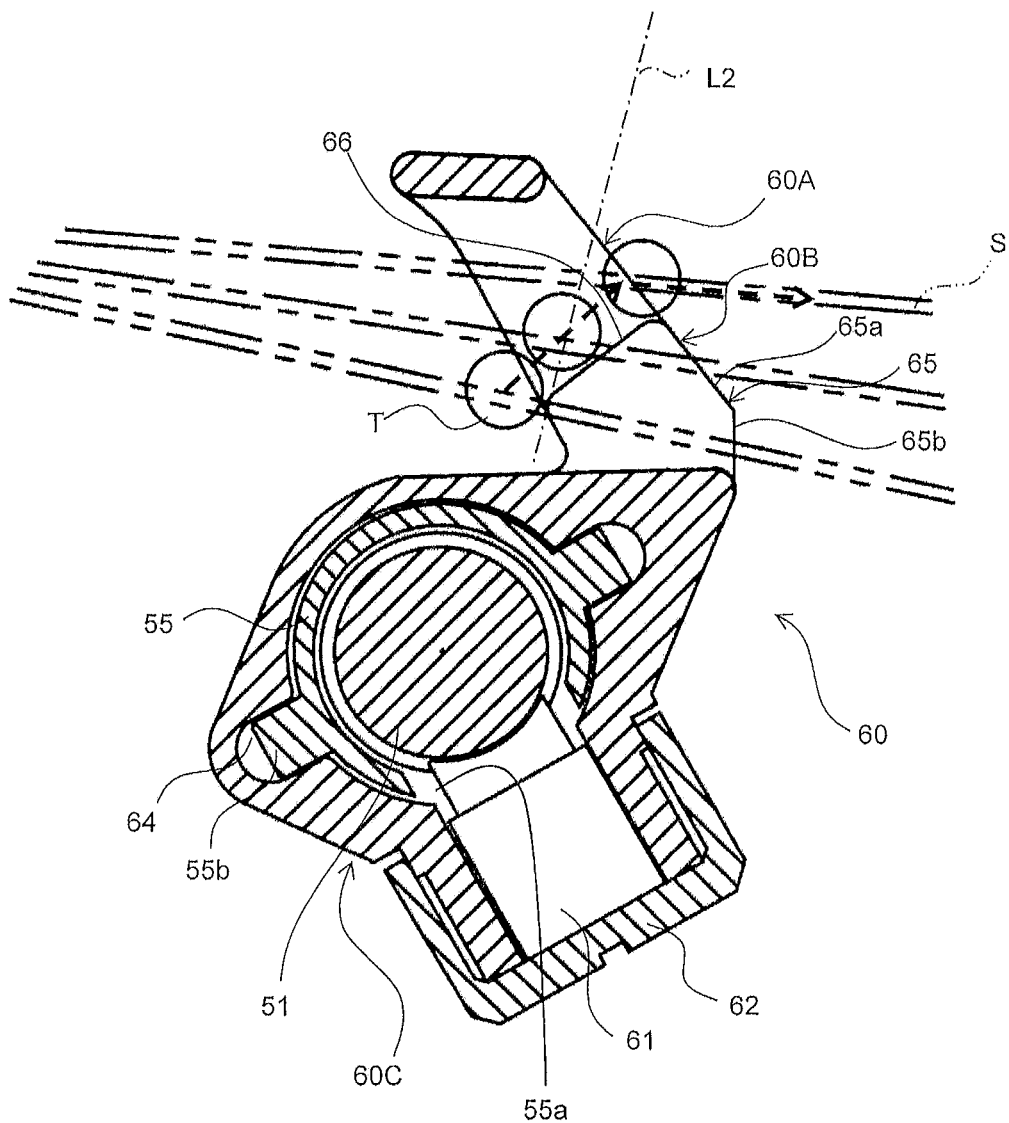
FIG. 5 is a sectional view of the fishing line guide of FIG. 3 along the line B-B.

The fishing line guide 60 will be now described in further detail with reference to FIGS. 4 and 5. FIGS. 4 and 5 are sectional views of the fishing line guide of FIG. 3 along the line B-B. Referring to FIG. 4, a front surface 65 of the fishing line guide 60 may be angled to the rear side with respect to a perpendicular line extended from the center of the rotational axis of the spool 5A to the extending direction of the fishing line S which is about to be wound on the spool 5A. To illustrate the angle of the front surface 65 with the perpendicular line to understand easily, the perpendicular line L2 extending from the center of the rotational axis of the spool 5A to the track S2 is shown as an example of the perpendicular lines in FIG. 4. The front surface 65 of the guide portion 60B is angled to the rear side with respect to any of the perpendicular lines extended from the center of the rotational axis of the spool 5A to the tracks where the fishing line S passes through the through hole 67*b*. More specifically, the front surface 65 of the guide portion 60B illustrated in FIG. 4 may include a first front surface 65*a* that has a relatively large slope with respect to the perpendicular line L2 and a second front surface 65*b* that has a relatively small slope with respect to the perpendicular line L2. Both the first and second front surfaces 65*a*, 65*b* are angled to the rear side with respect to the perpendicular line.

Moreover, referring to FIG. 5, a rear surface 66 of the fishing line guide 60 may be angled to the front side with respect to a perpendicular line extended from the center of the rotational axis of the spool 5A to the tracks of the fishing line S that passes through the through hole 67*b*. To illustrate the angle of the rear surface 66 with the perpendicular line to understand easily, the perpendicular line L2 is shown as an example of the perpendicular lines in FIG. 5.

When a knot T having a larger diameter than the left-right width of the through hole 67*b* is formed on the fishing line S and such a fishing line S is wound on the spool 5A through the above-described fishing line guide 60, the knot T cannot pass through the through hole 67*b* and is stopped by, for example, the second front surface 65*b*. At this point, the knot T is pulled to the rear direction along the second front surface 65*b* by the tension of the fishing line S as illustrated by the dotted-line arrow in FIG. 4 and then moved to the upper edge of the second front surface 65*b*. After the knot T is pulled to the upper edge of the second front surface 65*b*, the knot T may be further pulled to the rear direction along the first front surface 65*a*. Once the knot T reaches the upper edge of the first front surface 65a, the knot T can pass through the through hole 67a and move to the rear side along the extending direction of the fishing line S. Since the front surface 65 of the fishing line guide 60 is angled to the rear side with respect to the perpendicular line L2 extending from the center of the rotational axis of the spool 5A to the extending direction S2 of the fishing line S that is about to be wound as described above, even when the knot T is formed on the fishing line S, the knot T can be escaped to the rear side of the fishing line guide 60 (in other words, to the spool 5A). In this way, it is possible to prevent the fishing line S from getting caught on the fishing line guide 60.

Moreover, when the fishing line S is drawn out from the spool 5A at the time when, for example, fish bites a tackle, the knot T cannot pass through the through hole 67b and stops at the rear surface 66 of the fishing line guide 60. The knot T hit and stopped at the rear surface 66 is then pulled to the front direction along the rear surface 66 by the tension of the fishing line S as illustrated by the dotted-line arrow in FIG. 5. Once the knot T reaches the upper edge of the rear surface 66, the knot T can pass through the through hole 67a and move to the front side along the extending direction of the fishing line S. Since the rear surface 66 of the fishing line guide 60 is angled to the front side with respect to the perpendicular line extending from the center of the rotational axis of the spool 5A to the track of the fishing line S that passes through the through hole 67b, even when the knot T is formed on the fishing line S, the knot T can be escaped to the front side of the fishing line guide 60. In this way, it is possible to prevent the fishing line S from getting caught on the fishing line guide 60 even when the fishing line S is drawn out from the spool.

Figure 6:
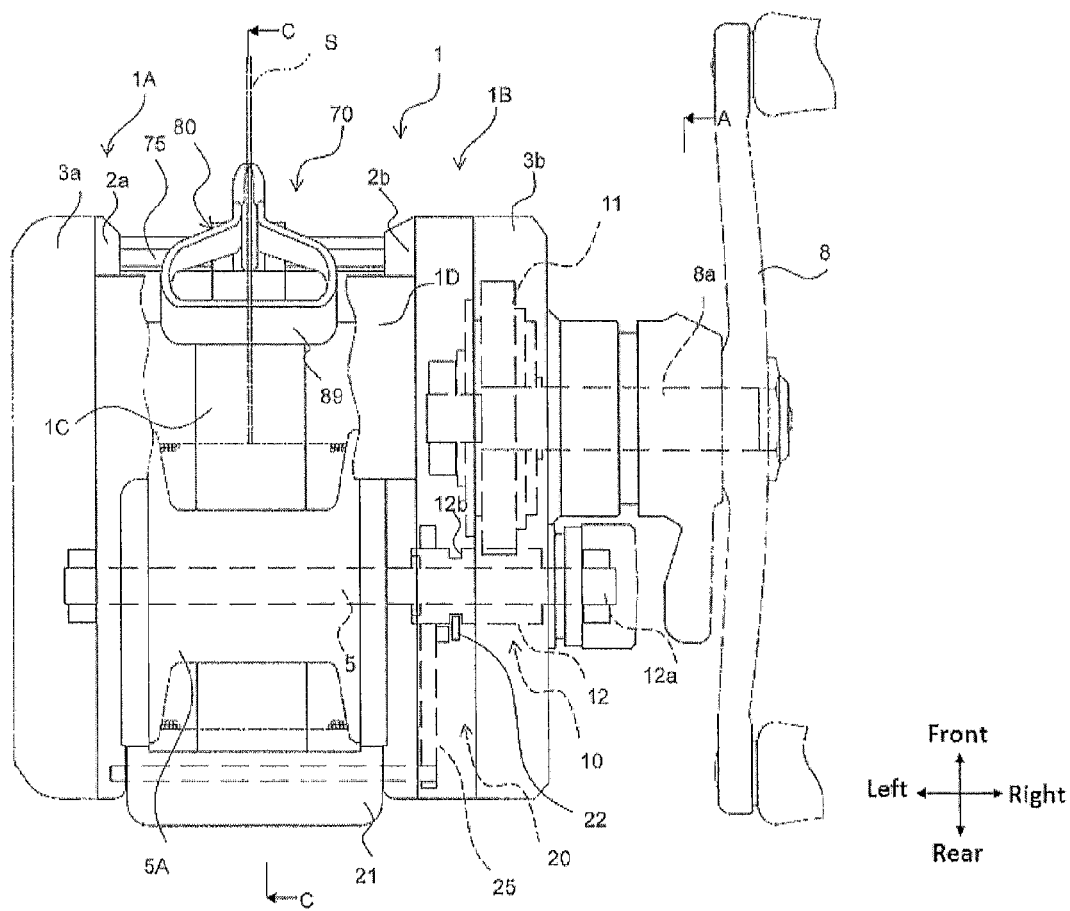
FIG. 6 is a schematic plan view of a fishing reel according to another embodiment of the invention.

Referring to FIGS. 6 to 13, a fishing reel according to another embodiment of the invention will be described. Like elements of the fishing reel illustrated in FIGS. 6 to 13 may be labeled similarly to those of the fishing reel illustrated in FIGS. 1 to 5, and those description will be hereunder omitted. The fishing reel illustrated in FIG. 6 is different from the fishing reel of FIG. 1 in that the fishing line guide has a different shape and the fishing line guide is arranged on the reel body such that it is rotated in accordance with ON/OFF of the clutch mechanism.

Figure 7:
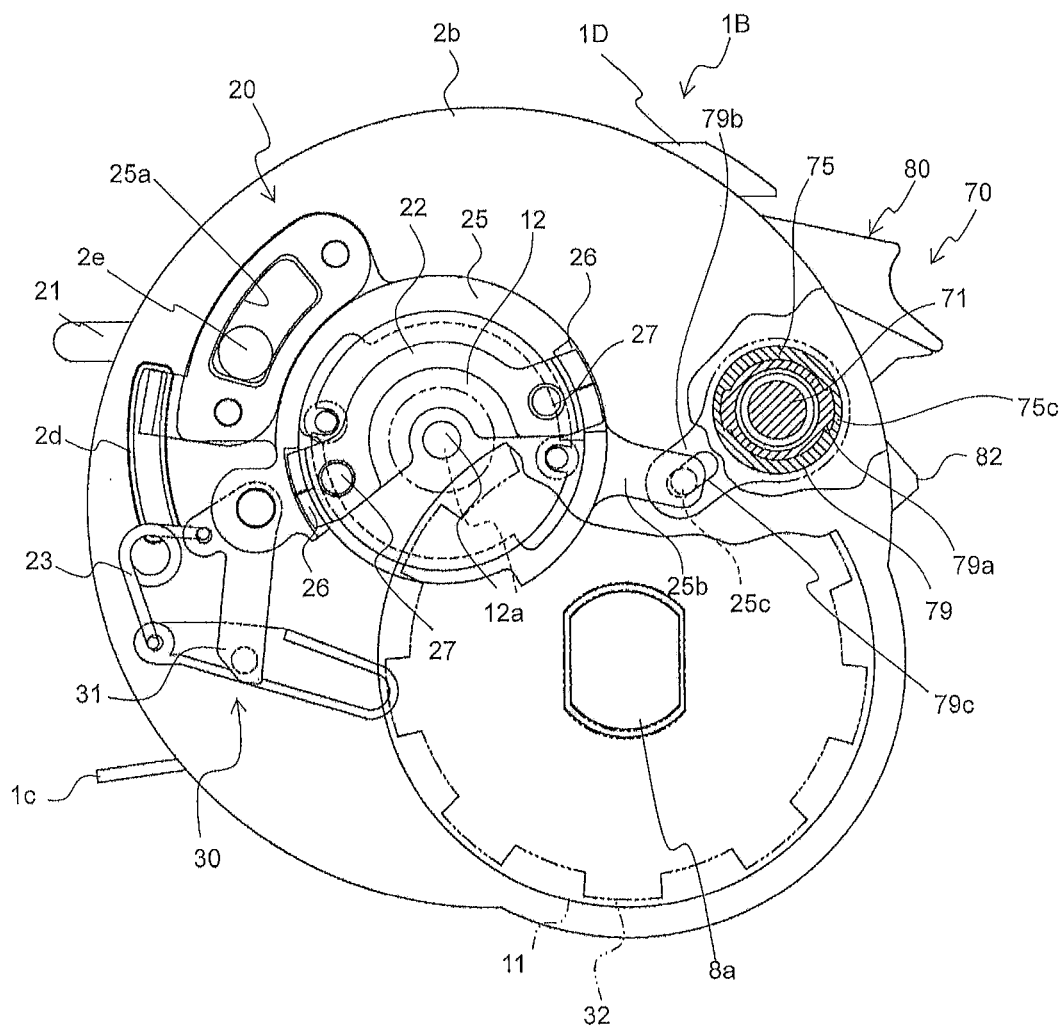
FIG. 7 is a side view of the fishing reel of FIG. 6.
Figure 8:
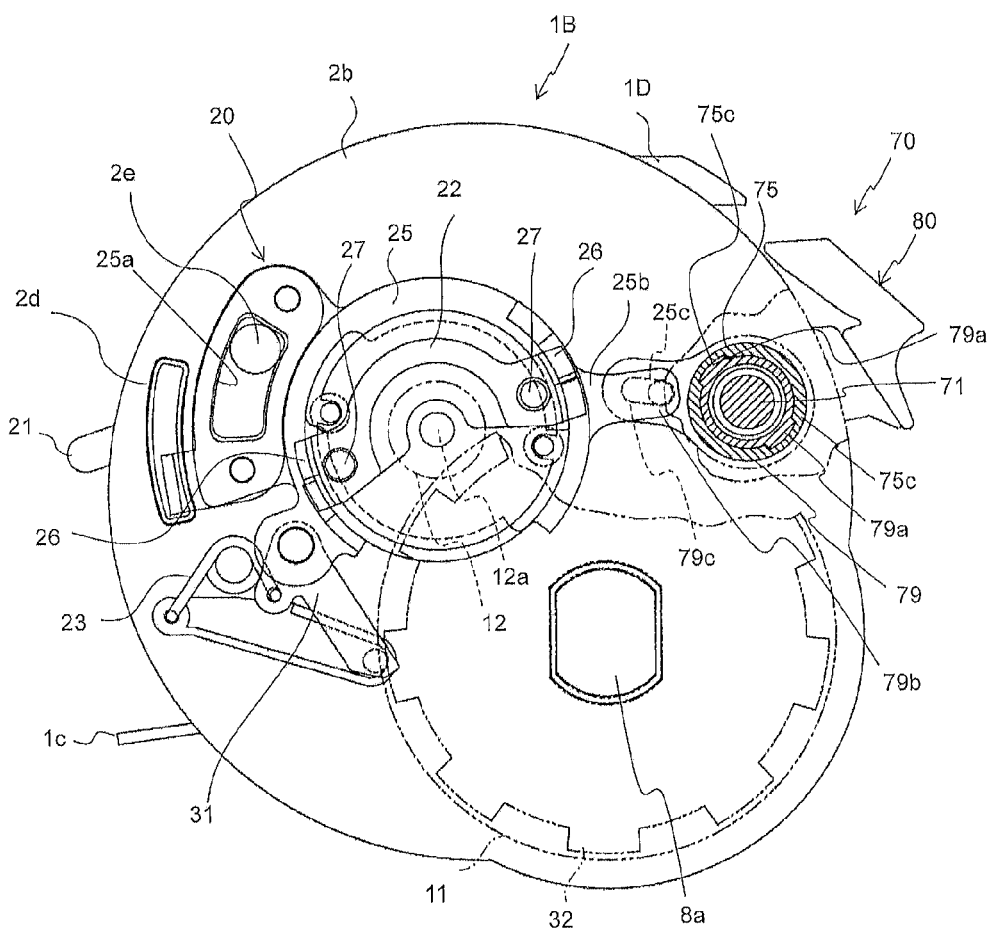
FIG. 8 is a side view of the fishing reel of FIG. 6.
Figure 9:
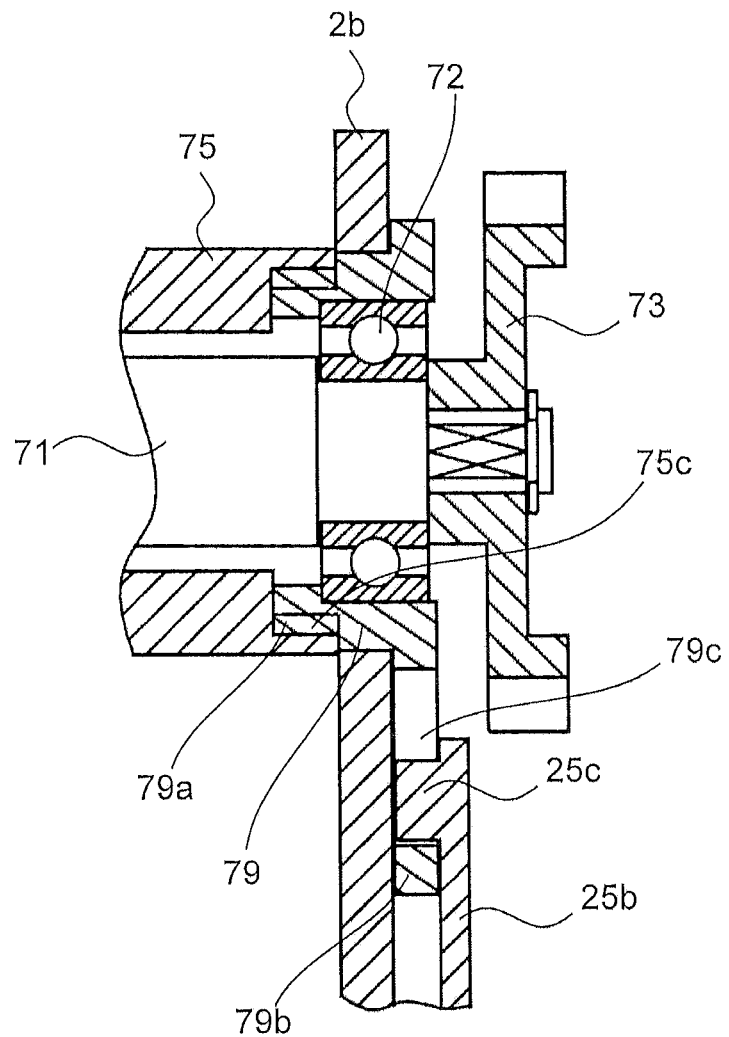
FIG. 9 is a sectional view showing a coupling portion between a clutch plate and a rotation plate.

Firstly, general description of the fishing reel will be given with reference to FIGS. 6 to 9. FIG. 6 is a plan view of the fishing reel according to another embodiment of the invention. FIGS. 7 and 8 are side views of the fishing reel of FIG. 6. FIG. 9 is a sectional view showing a coupling portion between a clutch plate and a rotation plate. FIG. 7 illustrates the clutch mechanism in ON state. FIG. 8 illustrates the clutch mechanism in OFF state. As illustrated in FIGS. 6 to 9, the fishing reel according to another embodiment may include the reel body 1, the spool 5A, the handle 8, the drive force transmission mechanism 10, the clutch mechanism 20, and a level wind mechanism 70.

The level wind mechanism 70 according to this embodiment is disposed between the left and right side plates 1A and 1B on the front side of the spool 5A. In one embodiment, the level wind device 70 may include a fishing line guide 80 through which the fishing line S is guided. The fishing line guide 80 is configured to reciprocate in the left-right direction in accordance with the rotational operation of the handle 8 so that the fishing line S can be uniformly wound on the spool 5A through the fishing line guide 80.

Referring to FIGS. 7 and 8, a clutch plate 25 is supported by a switch spring 23 that switches the state of the clutch plate 25 between a clutch-ON state illustrated in FIG. 7 and a clutch-OFF state illustrated in FIG. 8. The clutch plate 25 is coupled to the clutch lever 21 through a joint opening 2d that is formed in the upper-lower direction in the right frame 2b. A pin 2e is provided on the right frame 2b so as to protrude therefrom and inserted into an elongated opening 25a formed in the clutch plate 25. The rotation of the clutch plate 25 is guided with the pin 2e.

On the surface of the clutch plate 25, a pair of cam surfaces 26 may be formed. The pair of cam surfaces 26 is engagable with a yoke 22 engaged in a circumferential groove 12b of the pinion 12. A tip portion of the yoke 22 is held by support pins 27 that are disposed on the right frame 2b so as to protrude out from the right frame. The yoke 22 is always biased toward the clutch plate 25 by a spring member (not shown) disposed on each support pin. FIG. 7 illustrates the state where the yoke 22 is biased toward the clutch plate 25 by the spring member. At this point, the pinion 12 is engaged with an engagement formed at the end portion of the spool shaft, and thereby the rotation of the handle shaft 8a is transmitted to the spool shaft 5.

When the clutch lever 21 is pushed down from the position shown in FIG. 7, the clutch plate 25 is rotated in the counterclockwise direction, and the cam surfaces 26 formed on the surface of the clutch plate 25 biases the yoke 22 to the right direction in FIG. 6. The pinion 12 is moved in the right direction in FIG. 6 by the bias force of the yoke 22 and the pinion 12 is disengaged from the spool shaft 5. In this manner, the drive force transmission between the handle shaft 8a and the spool shaft 5 is cut off.

The clutch plate 25 may be provided with the automatic return mechanism 30 turning the clutch from the OFF state to the ON state. The automatic return mechanism 30 may include a kick member 31 integrally formed with the clutch plate, and a ratchet 32 unrotatably secured to the handle shaft 8a. When the handle 8 is operated for winding while the clutch mechanism 20 is in the clutch-OFF state, the kick member 31 is kicked up by the rotation of the ratchet 32 to enter into the rotation trajectory of the ratchet 32 and thereby the clutch mechanism 20 is automatically returned to the clutch-ON state. The clutch-ON state is retained by a force generated by the switch spring 23. Returning of the clutch mechanism 20 to the clutch-ON state can also be performed by pushing the clutch lever 21 down to the position illustrated in FIG. 7 to the position illustrated in FIG. 8.

Referring to FIG. 9, the level wind mechanism 70 may include a worm shaft 71 that is rotatably supported between the left side plate 1A and the right side plate 1B through a bearing 72, and a tubular body 75 rotatably disposed between the left side plate 1A and the right side plate 1B and through which the worm shaft 71 is inserted. In one embodiment, a spiral groove is formed on the surface of the worm shaft 71, and an elongated opening 75a extending in the axial direction is formed on the tubular body 75. The worm shaft 71 may be housed in the tubular body 75 such that the spiral groove is partially exposed from the elongated opening 75a of the tubular body 75. An input gear 73 to which the rotation of the handle shaft 8a is input is provided at the right end of the worm shaft 71. The rotation of the handle 8 is transmitted to the worm shaft 71 through the input gear.

The force transmission path from the clutch mechanism 20 to the tubular body 75 will be now described. Referring to FIG. 9, the clutch plate 25 may have a projection 25b projecting toward the front side of the reel body 1. An engaging projection 25c may be formed integrally at an end of the projection 25b. The engaging projection 25c projects toward the right frame 2b. The right frame 2b retains a rotation plate 79 that supports the worm shaft 71 through the bearing 72. A convex portion 79a projecting in the radial direction is formed on the rotation plate 79 and the convex portion 79*a* is fitted in a convex portion 75*c* formed on an end portion of the tubular body. In this manner, the tubular body 75 is unrotatably secured to the rotation plate 79.

The rotation plate 79 is rotatably supported between an outer ring of the bearing and the right frame 2*b*. The right frame 2*b* has a coupling piece 79*b* that is engaged with the projection 25*b* of the clutch plate 25. An elongated opening 79*c* may be formed in the coupling piece 79*b* and the engaging projection 25*c* of the projection 25*b* is inserted in the elongated opening 79*c*. In this manner, the rotation plate 79 is rotated on the axial center of the warm shaft 71 in accordance with the rotation of the clutch plate 25.

The fishing line guide 80 provided in the level wind mechanism 70 will be further described with reference to FIGS. 10 to 13. The fishing line guide 80 is reciprocated between the left and right side plates through the slidable member 81 in accordance with the rotation of the worm shaft 71. The fishing line guide 80 is also configured to rotate on the worm shaft 71 in accordance with ON/OFF of the above-described clutch mechanism 20. When the clutch mechanism 20 is the ON state, the fishing line guide 80 takes a standing position (fishing line winding position) illustrated in FIG. 10 (or FIG. 7), whereas when the clutch mechanism 20 is the OFF state, the fishing line guide 80 takes a tilted position (fishing line releasing position) illustrated in FIG. 11 (or FIG. 8).

The fishing line guide 80 may include a tip portion 80A in which a wide through hole is formed, a guide portion 80B in which a narrow through hole 87*c* is formed, and an attachment portion 80C for attaching the fishing line guide 80 to the tubular body 75. The through hole formed in the tip portion 80A may include a through hole 87*a* extending in the left-right direction, and a through hole 87*b* that is formed to be continuous with the through hole 87*a* and the through hole 87*c* and that has a left-right direction width smaller than the width of the through hole 87*a*. The through hole 87*b* is made wider in the left-right direction than the through hole 87*c* and the bottom portion of the through hole 87*b* is narrowed so as to be continuous with the through hole 87*c*.

A guide portion 80B of the fishing line guide 80 is herein defined as the portion between a virtual plane that contains the lowest track S2 of the fishing line S and is parallel to the spool shaft, and a virtual plane that is parallel to the spool shaft and contains a track (not shown) where the fishing line S passes the upper end of the through hole 87*c*. A tip portion 80A of the fishing line guide 80 is herein defined as the portion situated upper (tip side) than the guide portion 80B. An attachment portion 80C is herein defined as the portion of the fishing line guide 80 situated lower (base side) than the guide portion 80B.

The attachment portion 80C retains the slidable member 81 that engages with the spiral groove formed on the worm shaft 71 through the elongated opening 75*a*. The slidable member 81 is fixed to the attachment portion 80C with a cap nut 82. Further, rotation stoppers 75*b* are formed on an outer periphery of the tubular body 75 along the axial direction. The fishing line guide 80 is attached to the tubular body 75 such that engagement portions (concave portions) 84 formed in the attachment portion 80C are engaged with the rotation stoppers 75*b*. Because the rotation stoppers 75*b* are engaged with the engagement portions 84, the fishing line guide 80 is not rotated on the tubular body 75 by the rotation of the worm shaft 71 but reciprocates in the left-right direction. With the above-described configuration, when the handle 8 is operated for winding, the worm shaft 71 is rotationally driven via a connection gear provided on the handle shaft 8*a* and the input gear 73 engaged with the connection gear. When the worm shaft 71 is rotated, the slidable member 81 reciprocates in the left-right direction as the slidable member 61 is engaged with the spiral groove formed on the outer peripheral surface of the worm shaft 71. In this manner, the fishing line guide 80 reciprocates in the left-right direction along the worm shaft 71 between the left side plate 1A and the right side plate 1B in accordance with the rotation of the handle 8.

Figure 10:
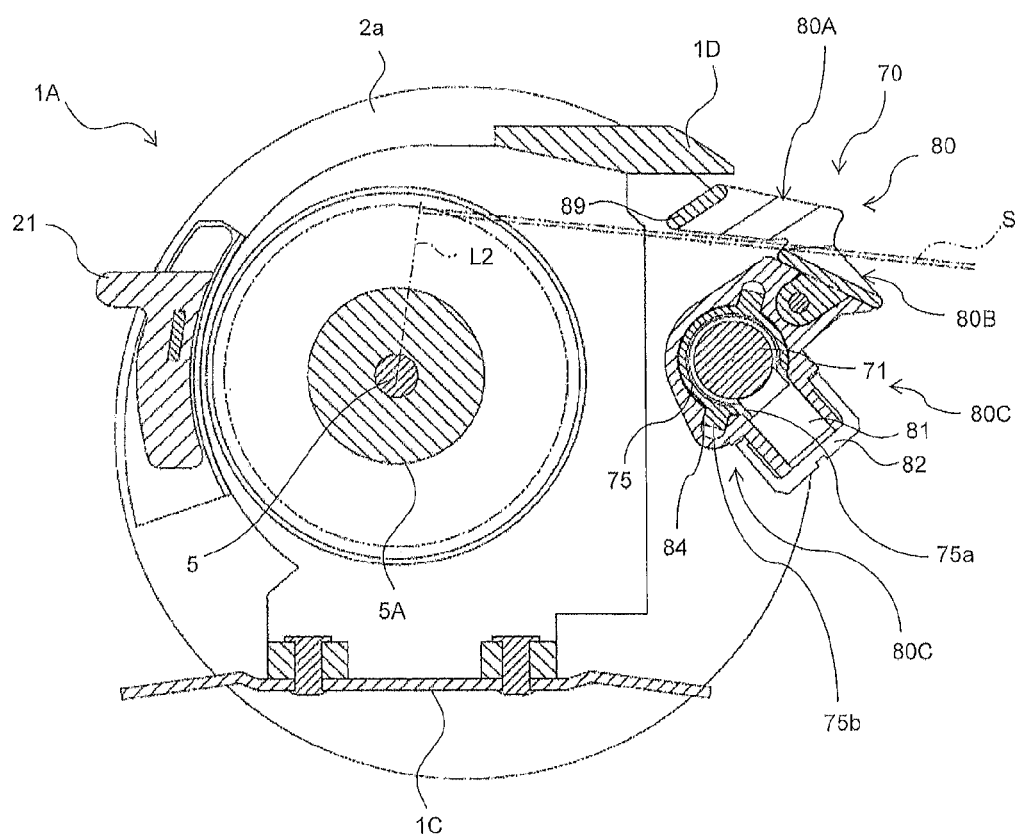
FIG. 10 is a sectional view of the fishing reel of FIG. 6 along the line C-C.

When the fishing line S is wound on the spool 5A, the clutch mechanism 20 is in the clutch-ON state so that the fishing line guide 80 takes the tilted position illustrated in FIG. 10 (or FIG. 7). When the fishing line guide 80 is in the tilted position, an upper wall 89 of the tip portion 80A comes closer to the track of the fishing line S from the above compared to the standing position. The upper wall 89 can restrict the fishing line S from moving to the upper direction, which leads the fishing line S to the through hole 87*c*. The fishing line guide 80 may be configured such that the upper wall 89 contacts the fishing line S from above when the guide 80 takes the tilted position. In this way, the fishing line S can be securely guided to the through hole 87*c* by the upper wall 89.

Figure 11:
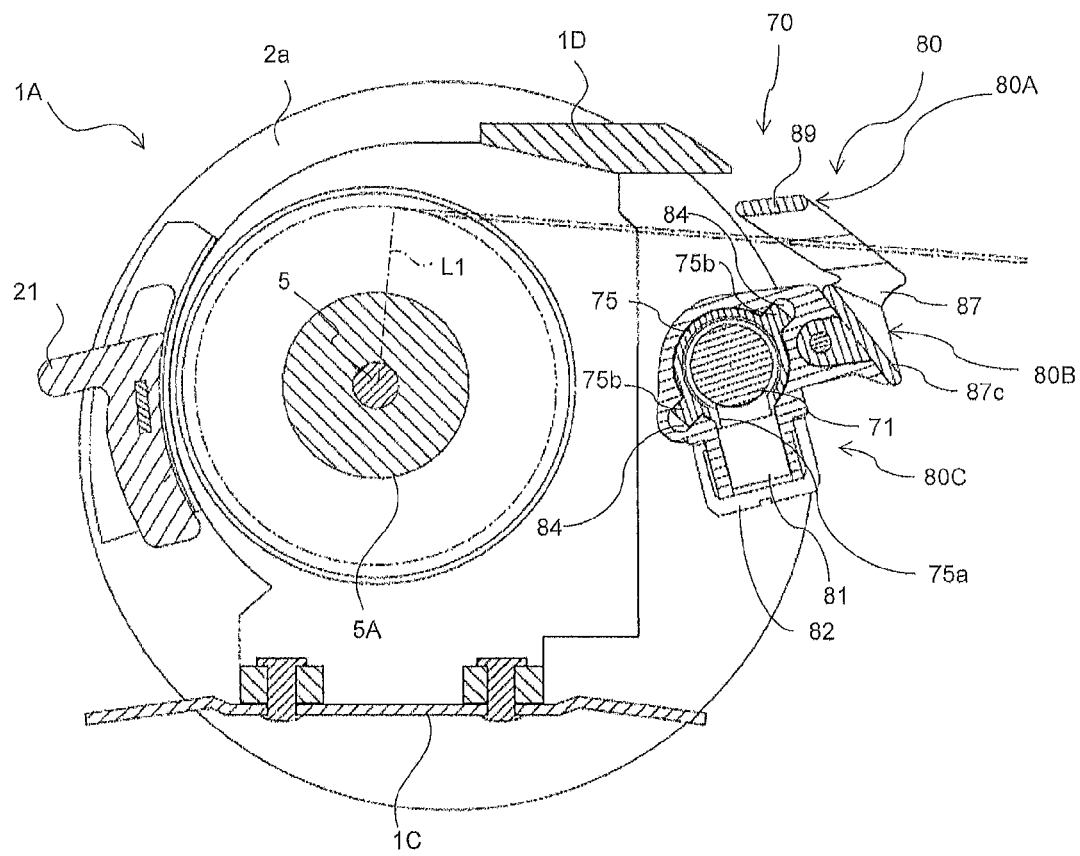
FIG. 11 is a sectional view of the fishing reel of FIG. 6 along the line C-C.
Figure 12:
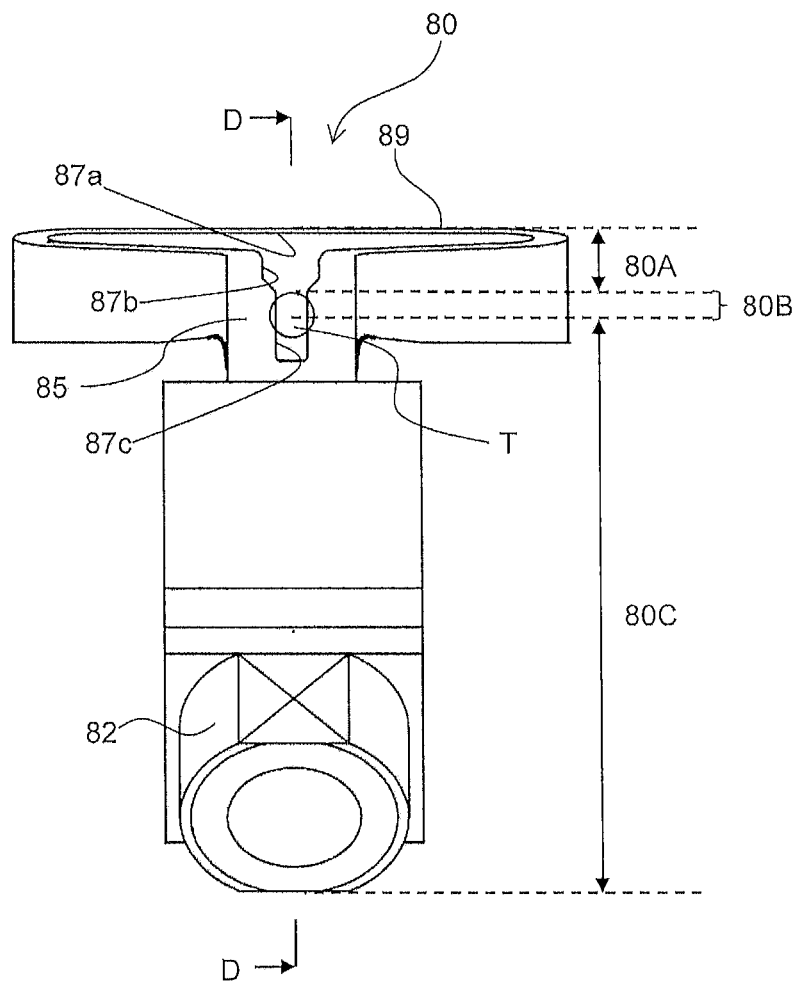
FIG. 12 is an elevation view of the fishing line guide of FIG. 6.

When the fishing line S is released at the time of casting or the like, the clutch lever 21 is pushed down from the position illustrated in FIG. 10 to the position illustrated in FIG. 11 to switches the clutch mechanism 20 to the clutch-OFF state. When the clutch lever 21 is pushed down, the fishing line guide 80 is rotated on the worm shaft 71 as described above and then takes the standing position illustrated in FIG. 11. A cross section projected to a plane perpendicular to a releasing direction of the fishing line S is larger when the fishing line guide 80 is in the standing position than when the fishing line guide 80 is in the tilted position. Therefore by releasing the fishing line S through the fishing line guide 80 in the standing position illustrated in FIG. 11, it is possible to prevent the reduction in the flying distance of a tackle caused by the contact of the fishing line S with the fishing line guide 80.

Figure 13:
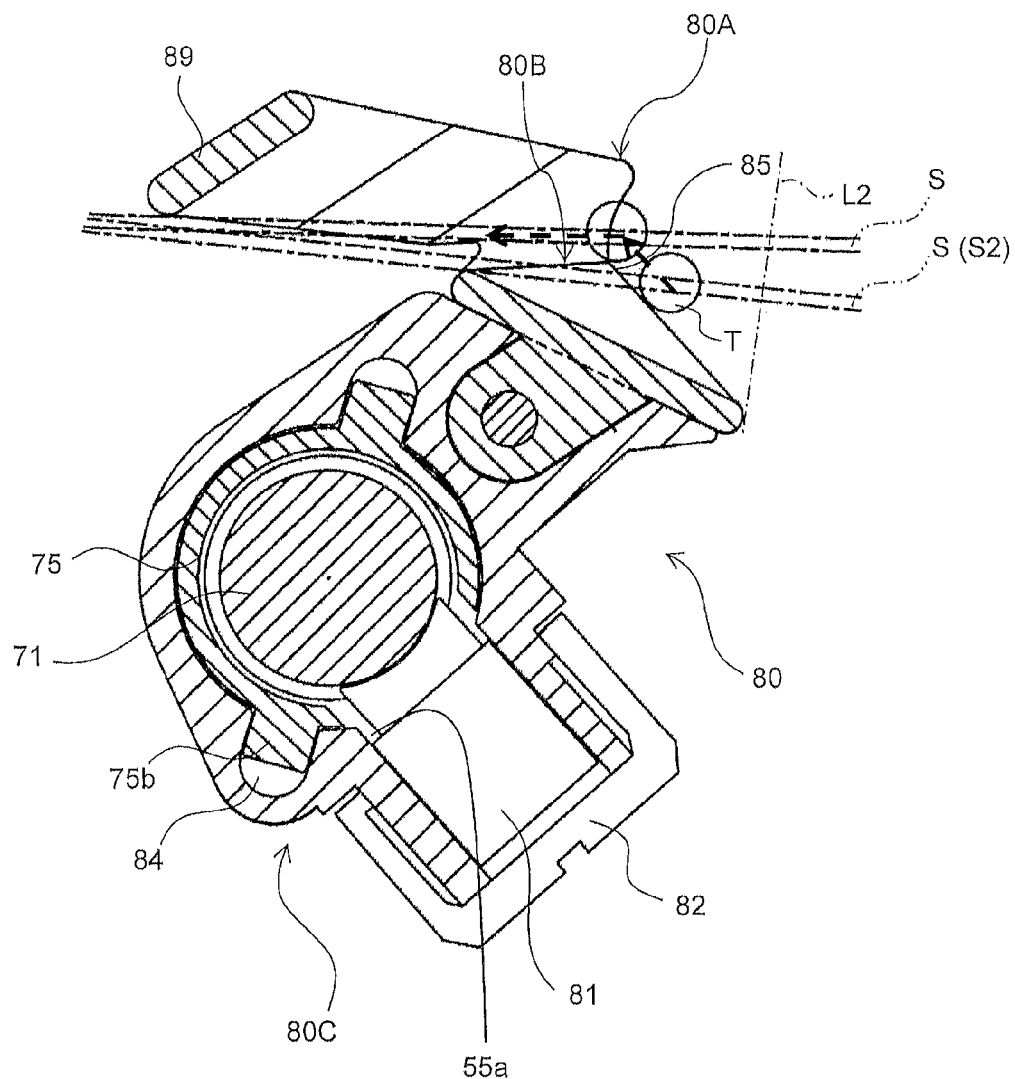
FIG. 13 is a sectional view of the fishing line guide of FIG. 12 along the line D-D.

The fishing line guide 80 will be now described in further detail with reference to FIG. 13. FIG. 13 is a sectional view of the fishing line guide 80 of FIG. 12 along the line D-D. Moreover, referring to FIG. 13, a front surface 85 of the guide portion 80B of the fishing line guide 80 may be angled to the rear side with respect to a perpendicular line extended from the center of the rotational axis of the spool 5A to the tracks of the fishing line S that passes through the through hole 87*c*. To illustrate the angle of the rear surface 85 with the perpendicular line to understand easily, the perpendicular line L2 is shown as an example of the perpendicular lines in FIG. 13.

When the knot T having a larger diameter than the left-right width of the through hole 87*c* is formed on the fishing line S and such a fishing line S is wound on the spool 5A through the above-described fishing line guide 80, the knot T cannot pass through the through hole 87*c* and is stopped by, for example, the front surface 85. At this point, the knot T is pulled to the rear direction along the front surface 85 by the tension of the fishing line S as illustrated by the dotted-line arrow in FIG. 13. After the knot T reaches the upper edge of the front surface 85, the knot T can pass through the through hole 87*b* and move to the rear side along the extending direction of the fishing line S. Since the front surface 85 of the fishing line guide 80 is angled to the rear side with respect to the perpendicular line extending from the center of the rotational axis of the spool 5A to the track of the fishing line S that is about to be wound as described above, even when the knot T is formed on the fishing line S, the knot T can be escaped to the rear side of the fishing line guide 80 (in other words, to the spool 5A). In this way, according to the embodiment of the invention, it is possible to prevent the fishing line S from getting caught on the fishing line guide 80.

Embodiments of the present invention are not limited to the above embodiments but various modifications are possible within a spirit of the invention. For instance, the materials, shapes, sizes, configurations, numbers, arrangements and the like of the components of the above-described embodiments may be adequately modified.

What is claimed is:

1. A fishing reel, comprising:
    a spool rotatably supported between a left side plate and a right side plate of a reel body; and
    a fishing line guide having a first portion, a second portion and an attachment portion, the first portion having a first through hole, the second portion having a second through hole, the first through hole guiding a fishing line to be wound on the spool, and the second through hole having a width in a left-right direction larger than the first through hole and being continuous with the first through hole, the attachment portion extending from a lower end of the first portion, wherein
    the first through hole extends to the lower end of the first portion;
    a front surface of the first portion is angled towards a rear side with respect to a perpendicular line extended from a center of a rotational axis of the spool to an extending direction of the fishing line; and
    a rear surface of the first portion is angled towards a front side with respect to the perpendicular line.

2. The fishing reel of claim 1, wherein the second portion is formed to be continuous with an upper end of the first portion.

3. The fishing reel of claim 1 wherein
    the fishing line guide is configured to take a first position when the fishing line is released and to take a second position when the fishing line is wound, and
    the front surface of the first portion is angled towards the rear side when the fishing line guide is in the second position.

4. The fishing reel of claim 3 wherein the rear surface of the first portion is angled towards the front side with respect to the perpendicular line when the fishing line guide is in the second position.

5. The fishing reel of claim 3, further comprising:
    a handle provided on the reel body; and
    a clutch mechanism configured to switch a transmission of a drive force from the handle to the spool between ON and OFF states, wherein
    the fishing line guide takes the second position when the clutch mechanism is in ON state.

6. The fishing reel of claim 5, wherein the fishing line guide is configured to reciprocate between the left side plate and the right side plate in accordance with a rotational operation of the handle.

\* \* \* \* \*